United States Patent
Kono

(10) Patent No.: US 12,291,205 B2
(45) Date of Patent: May 6, 2025

(54) VEHICLE CONTROL DEVICE AND VEHICLE CONTROL METHOD

(71) Applicant: Mitsubishi Electric Corporation, Tokyo (JP)

(72) Inventor: Takuya Kono, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 389 days.

(21) Appl. No.: 17/771,337

(22) PCT Filed: Nov. 29, 2019

(86) PCT No.: PCT/JP2019/046753
§ 371 (c)(1),
(2) Date: Apr. 22, 2022

(87) PCT Pub. No.: WO2021/106185
PCT Pub. Date: Jun. 3, 2021

(65) Prior Publication Data
US 2022/0371589 A1    Nov. 24, 2022

(51) Int. Cl.
*B60W 30/165*    (2020.01)
*G05D 1/00*    (2006.01)

(52) U.S. Cl.
CPC ......... *B60W 30/165* (2013.01); *G05D 1/0022* (2013.01); *B60W 2556/45* (2020.02)

(58) Field of Classification Search
None
See application file for complete search history.

(56) References Cited

U.S. PATENT DOCUMENTS

2013/0121190 A1* 5/2013 Lu .................. H04L 1/1825
370/252
2013/0302579 A1   11/2013 Kuge et al.
(Continued)

FOREIGN PATENT DOCUMENTS

JP    2012-214782 A    11/2012
JP    2017126149 A  *   7/2017
(Continued)

OTHER PUBLICATIONS

International Search Report for PCT/JP2019/046753 dated Feb. 18, 2020.
Written Opinion for PCT/JP2019/046753 dated Feb. 18, 2020.

*Primary Examiner* — David P. Merlino
*Assistant Examiner* — Samantha P. Pelow
(74) *Attorney, Agent, or Firm* — Sughrue Mion, PLLC

(57) ABSTRACT

A control switching unit inquires of a remote control center via a communication unit as to presence or absence of another vehicle traveling within a predetermined range including a host vehicle and being switchable from remote driving control to follow-up driving control when a communication quality detected by a communication quality detecting unit becomes less than a predetermined communication quality during the control of the driving of the host vehicle by a remote driving control unit. The control switching unit causes the remote driving control unit to continuously control the driving of the host vehicle when there is a response indicating presence of the another vehicle, and causes a follow-up driving control unit to control the driving of the host vehicle when there is a response indicating absence of another vehicle.

5 Claims, 10 Drawing Sheets

(56) References Cited

U.S. PATENT DOCUMENTS

| | | | | |
|---|---|---|---|---|
| 2016/0134994 A1* | 5/2016 | Kellner | ................... | H04L 67/12 |
| | | | | 370/329 |
| 2017/0166207 A1* | 6/2017 | Darms | ................ | B60W 30/165 |
| 2017/0168505 A1* | 6/2017 | Meinecke | .............. | G01C 21/26 |
| 2019/0271991 A1* | 9/2019 | Dulmage | ................. | G08G 5/25 |
| 2021/0031809 A1* | 2/2021 | Tarao | .................... | B60W 50/14 |
| 2021/0197808 A1 | 7/2021 | Maeda et al. | | |

FOREIGN PATENT DOCUMENTS

| | | | | | |
|---|---|---|---|---|---|
| JP | 2018123000 A | * | 8/2018 | ............ | B66F 17/003 |
| WO | 2019/077739 A1 | | 4/2019 | | |
| WO | WO-2019132081 A1 | * | 7/2019 | ............. | H04W 4/12 |

\* cited by examiner

VEHICLE CONTROL DEVICE AND VEHICLE CONTROL METHOD

CROSS REFERENCE TO RELATED APPLICATIONS

This application is a National Stage of International Application No. PCT/JP2019/046753 filed Nov. 29, 2019.

TECHNICAL FIELD

The present invention relates to a vehicle control device and a vehicle control method.

BACKGROUND ART

For example, a mobile object control system described in Patent Literature 1 includes a control device that performs autonomous driving of a vehicle and a remote control device that remotely controls the vehicle when the control device cannot continue the autonomous driving of the vehicle. Radio networks such as Third Generation Mobile Communication System (3G), Long Term Evolution (LTE), and Fifth Generation Mobile Communication System (5G) are used for communication between the vehicle and the remote control device.

CITATION LIST

Patent Literature

Patent Literature 1: International Publication No. 2019/077739

SUMMARY OF INVENTION

Technical Problem

The band of the radio network that can be used by the conventional mobile object control system as described in Patent Literature 1 is limited in the same area, that is, in the communication area of the same base station. Thus, there is a problem that the remote control device cannot remotely control a vehicle when communication quality necessary for remote control of the vehicle cannot be ensured due to an insufficient band of the radio network.

The present invention has been made to solve the above problem, and has an object to ensure communication quality necessary for remote control of a vehicle.

Solution to Problem

A vehicle control device according to the present invention includes: processing circuitry to communicate with a remote control center and receive remote control information for remotely controlling a first vehicle from the remote control center; detect communication quality control driving of the first vehicle based on remote driving control using the remote control information; control the driving of the first vehicle based on follow-up driving control so as to travel following a preceding vehicle traveling ahead of the first vehicle; and take control of the driving of the first vehicle by switching the remote driving control and the follow-up driving control; wherein the processing circuitry inquires of the remote control center via the communication unit as to presence or absence of a second vehicle traveling within a predetermined range including the first vehicle, the second vehicle being switchable from the remote driving control to the follow-up driving control, when the detected communication quality becomes less than a predetermined communication quality during the control of the driving of the first vehicle based on the remote driving control, and the processing circuitry continuously controls the driving of the first vehicle based on the remote driving control when there is a response indicating absence of the second vehicle, and the processing circuitry controls the driving of the first vehicle based on the follow-up driving control when there is a response indicating presence of the second vehicle.

A vehicle control device according to the present invention includes: a communication unit to communicate with a remote control center and receive remote control information for remotely controlling a first vehicle from the remote control center; a communication quality detecting unit to detect communication quality of the communication unit; a remote driving control unit to control driving of the first vehicle using the remote control information; a follow-up driving control unit to control the driving of the first vehicle so as to travel following a preceding vehicle traveling ahead of the first vehicle; and a control switching unit to cause the remote driving control unit or the follow-up driving control unit to take control of the driving of the first vehicle, and wherein the control switching unit inquires of the remote control center via the communication unit as to presence or absence of a second vehicle traveling within a predetermined range including the first vehicle, the second vehicle being switchable from the remote driving control to the follow-up driving control, when the communication quality detected by the communication quality detecting unit becomes less than a predetermined communication quality during the control of the driving of the first vehicle by the remote driving control unit, and the control switching unit causes the remote driving control unit to continuously control the driving of the first vehicle

Advantageous Effects of Invention

According to the present invention, when the communication quality of the first vehicle deteriorates while the remote control center remotely controls the first vehicle, the remote control center causes the second vehicle traveling around the first vehicle to switch from the remote driving control to the follow-up driving control. Therefore, the communication band available to the first vehicle is recovered, and the communication quality necessary for the remote control of the first vehicle can be ensured.

DESCRIPTION OF EMBODIMENTS

In order to explain this invention in more detail, a mode for carrying out this invention will be described below by referring to the accompanying drawings.

First Embodiment

Figure 1:
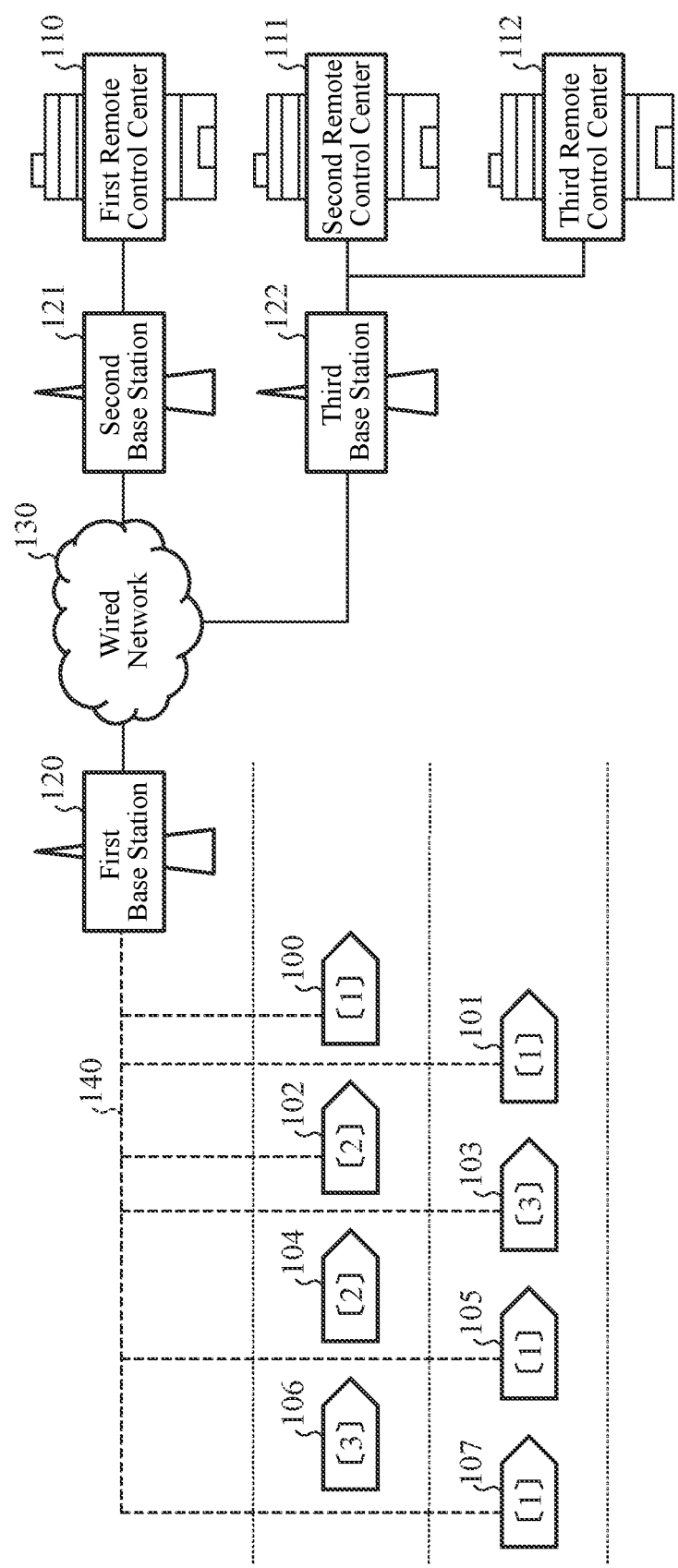
FIG. 1 is an overall configuration diagram of a vehicle control system according to a first embodiment.

FIG. 1 is an overall configuration diagram of a vehicle control system according to a first embodiment. The vehicle control system in the illustrated example includes a plurality of vehicles 100 to 107, and a first remote control center 110, a second remote control center 111, and a third remote control center 112 capable of remotely controlling the plurality of vehicles 100 to 107. The numerical value assigned to each of the vehicles 100 to 107 indicates the number of the remote control center that remotely controls the vehicle. The vehicles 100, 101, 105, and 107 to which the numerical value [1] is assigned are remotely controlled by the first remote control center 110. The first remote control center 110 implements remote control of the vehicles 100, 101, 105, and 107 by communicating with the vehicles 100, 101, 105, 107 via a second base station 121, a wired network 130, a first base station 120, and a radio network 140. The vehicles 102 and 104 to which the numerical value [2] is assigned are remotely controlled by the second remote control center 111. The second remote control center 111 implements remote control of the vehicles 102 and 104 by communicating with the vehicles 102 and 104 via a third base station 122, the wired network 130, the first base station 120, and the radio network 140. The vehicles 103 and 106 to which the numerical value [3] is assigned are remotely controlled by the third remote control center 112. The third remote control center 112 implements remote control of the vehicles 103 and 106 by communicating with the vehicles 103 and 106 via the third base station 122, the wired network 130, the first base station 120, and the radio network 140. In the illustrated example, the first base station 120 controls the radio network 140 in the area where the vehicles 100 to 107 to be remotely controlled are traveling. That is, the vehicles 100 to 107 are present within the communication area of the first base station 120.

Each of the first remote control center 110, the second remote control center 111, and the third remote control center 112 has one or more operators who operate remote operation terminals. The remote operation terminal includes, for example, a driver's seat, an accelerator, a brake, a steering, meters, a display device, and the like. The remote operation terminal controls the meters on the basis of information transmitted from the vehicle to be remotely controlled, and displays a vehicle exterior image transmitted from the vehicle to be remotely controlled on the display device. The operator operates the accelerator, the brake, the steering, and the like while watching the meters and the display device. The remote operation terminal generates remote operation information on the basis of an operation content of the accelerator or the like. The remote control center transmits the remote operation information generated by the remote operation terminal to the vehicle to be remotely controlled.

Figure 2:
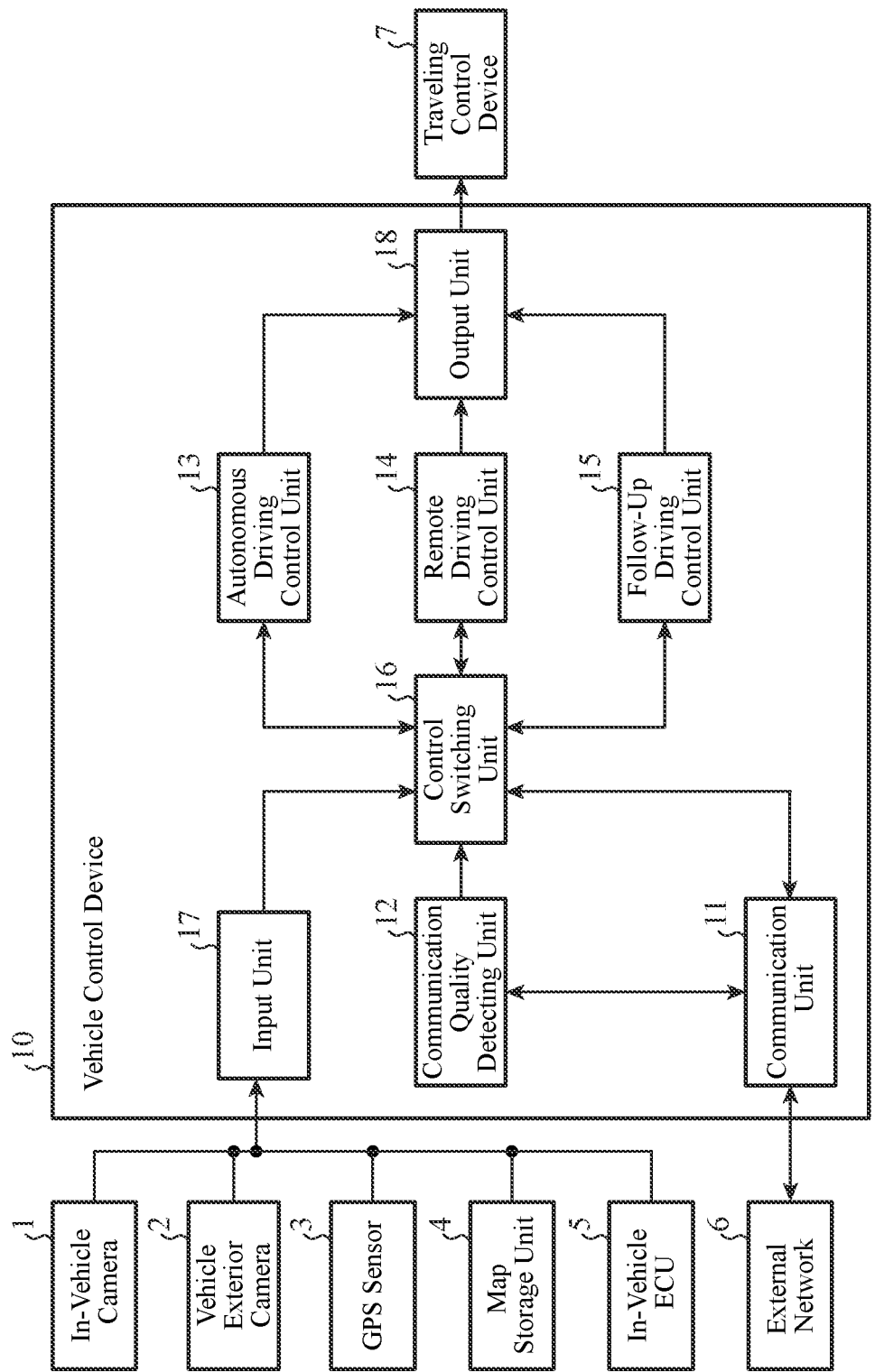
FIG. 2 is a block diagram showing a configuration example of a vehicle control device according to the first embodiment.

FIG. 2 is a block diagram showing a configuration example of a vehicle control device 10 according to the first embodiment. The vehicle control device 10 is mounted on each of the vehicles 100 to 107. The vehicle control device 10 includes a communication unit 11, a communication quality detecting unit 12, an autonomous driving control unit 13, a remote driving control unit 14, a follow-up driving control unit 15, a control switching unit 16, an input unit 17, and an output unit 18.

The input unit 17 receives various types of information from an in-vehicle camera 1, a vehicle exterior camera 2, a global positioning system (GPS) sensor 3, a map storage unit 4, and an in-vehicle electronic control unit (ECU) 5 mounted on a host vehicle. The in-vehicle camera 1 captures an image of the interior of the host vehicle, detects the state of an occupant using the captured image, and inputs a detection result to the input unit 17. The vehicle exterior camera 2 captures an image of the exterior of the vehicle, detects a preceding vehicle or the like using the captured image, and inputs a detection result to the input unit 17. The GPS sensor 3 detects a position of the host vehicle and inputs a detection result to the input unit 17. The map storage unit 4 stores map information, and outputs map information around a road on which the host vehicle is traveling to the input unit 17. The in-vehicle ECU 5 inputs, to the input unit 17, information on a preceding vehicle or the like detected by a sensor such as light detection and ranging (LIDAR) mounted on the host vehicle, information on a controller area network (CAN), and the like.

The communication unit 11 communicates with a remote control center that remotely controls the host vehicle via, an external network 6. When the remote control center that remotely controls the host vehicle is the first remote control center 110, the external network 6 includes the radio network 140, the first base station 120, the wired network 130, and the second base station 121. Furthermore, the communication unit 11 may communicate with other vehicles around the host vehicle via the external network 6. In this case, the external network 6 is inter-vehicle communication.

The communication quality detecting unit 12 detects the communication quality between the communication unit 11 and the remote control center, and outputs the detected communication quality to the control switching unit 16. The communication quality is, for example, a maximum delay time.

The control switching unit 16 switches the driving control of the host vehicle to any one of the autonomous driving control unit 13, the remote driving control unit 14, and the follow-up driving control unit 15 by using various types of information received from the input unit 17, various types of information received from the communication unit 11, information of communication quality received from the communication quality detecting unit 12, or the like. Alternatively, the control switching unit 16 switches the driving control of the host vehicle to any one of the autonomous driving control unit 13, the remote driving control unit 14, the follow-up driving control unit 15, and the manual driving of the driver using the above information and the like. In addition, the control switching unit 16 acquires information necessary for driving control by the autonomous driving control unit 13, the remote driving control unit 14, and the follow-up driving control unit 15 via the input unit 17 and the communication unit 11, and outputs the acquired information to the autonomous driving control unit 13, the remote driving control unit 14, and the follow-up driving control unit 15. In addition, the control switching unit 16 transmits, as necessary, information indicating whether the driving control of the host vehicle is autonomous driving, remote driving, or follow-up driving, or information necessary for remote control of the host vehicle among various types of information received by the input unit 17, to the remote control center via the communication unit 11. The information necessary for the remote control of the host vehicle is, for example, a vehicle exterior image captured by the vehicle exterior camera 2, a position of the host vehicle detected by the GPS sensor 3, CAN information detected by the in-vehicle ECU 5, and the like. In addition, the control switching unit 16 transmits position information, route information, and the like of the host vehicle to another vehicle via the communication unit 11 as necessary.

The autonomous driving control unit 13 performs autonomous driving control of the host vehicle using various types of information received from the input unit 17 via the control switching unit 16. For example, the autonomous driving control unit 13 generates a travel plan of the host vehicle by using information of a destination set by an occupant of the host vehicle, position information of the host vehicle input from the GPS sensor 3, map information input from the map storage unit 4, and information of a relative distance and a relative speed of another vehicle present around the host vehicle input from the vehicle exterior camera 2 and the in-vehicle ECU 5. Then, the autonomous driving control unit 13 calculates a command value to the traveling control device 7 that controls the steering, the brake, the accelerator, and the like on the basis of the travel plan, and outputs the command value to the traveling control device 7 via the output unit 18. When these command values are given to the traveling control device 7, autonomous traveling of the host vehicle is implemented.

The remote driving control unit 14 calculates a command value to the traveling control device 7 that controls the steering, the brake, the accelerator, and the like on the basis of the remote control information received from the communication unit 11 via the control switching unit 16, and outputs the command value to the traveling control device 7 via the output unit 18. By providing these command values to the traveling control device 7, remote control of the host vehicle by the operator at the remote control center is implemented.

The follow-up driving control unit 15 detects a preceding vehicle traveling ahead of the host vehicle, that is, a follow-up target vehicle, by using information of a relative distance and a relative speed of another vehicle present around the host vehicle input from the vehicle exterior camera 2 or the in-vehicle ECU 5 via the control switching unit 16. In addition, the communication unit 11 may perform inter-vehicle communication to receive position information, route information, and the like of another vehicle present around the host vehicle, and the follow-up driving control unit 15 may detect the follow-up target vehicle using these pieces of information. Furthermore, the communication unit 11 may receive information on the follow-up target vehicle from the remote control center. The follow-up driving control unit 15 calculates a command value to the traveling control device 7 that controls a steering, a brake, an accelerator, and the like so that the host vehicle follows the follow-up target vehicle, and outputs the command value to the traveling control device 7 via the output unit 18. By providing these command values to the traveling control device 7, follow-up traveling of the host vehicle with respect to the preceding vehicle is implemented.

The output unit 18 outputs various types of command values received from the autonomous driving control unit 13, the remote driving control unit 14, and the follow-up driving control unit 15 to the traveling control device 7. The traveling control device 7 controls the steering, the brake, the accelerator, and the like of the host vehicle.

Next, the operation of the vehicle control device 10 will be described.

Figure 3A:
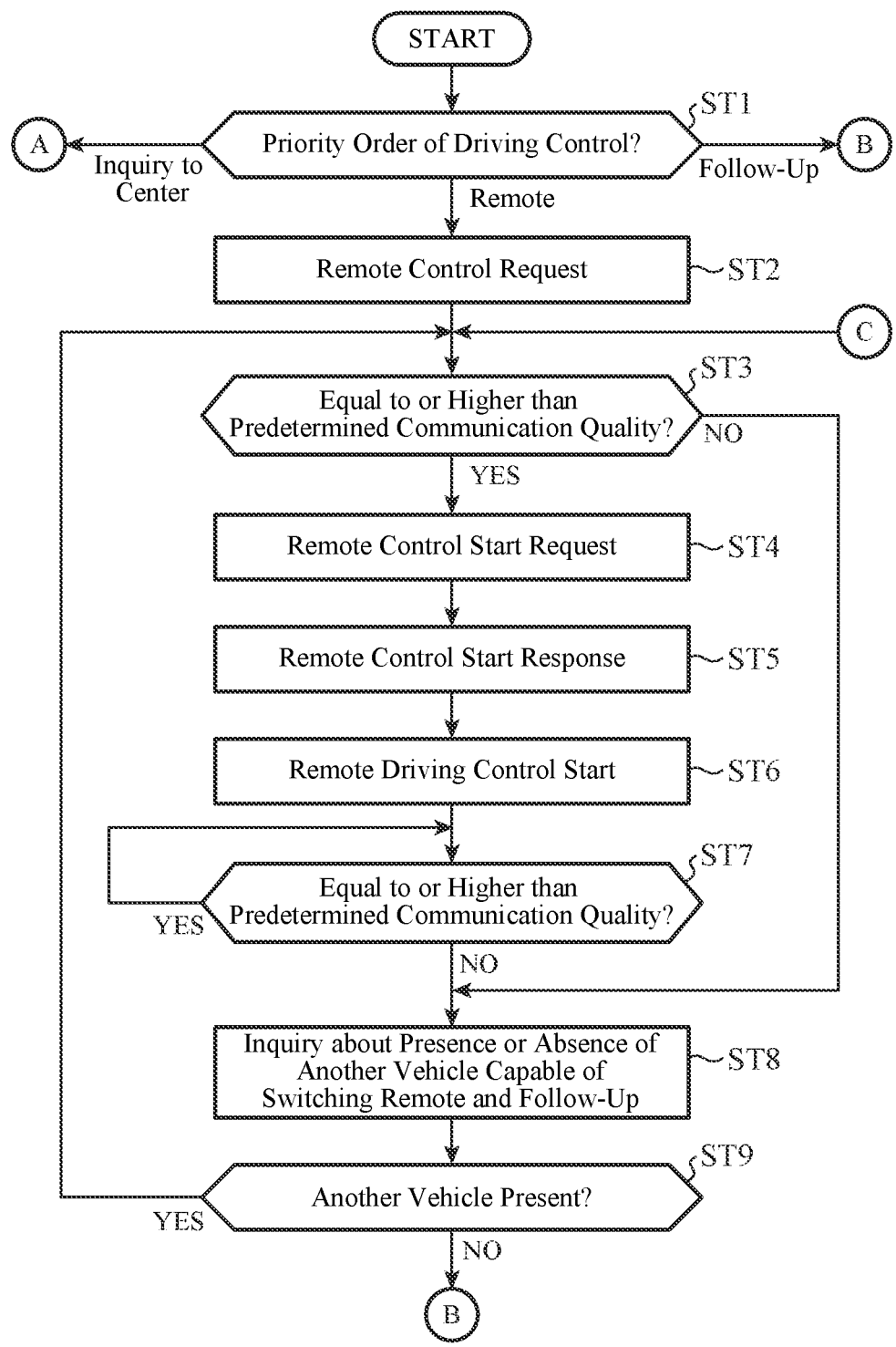
FIG. 3A is a flowchart illustrating an operation example of the vehicle control device in a case where switching of driving control of a host vehicle is required.
Figure 3B:
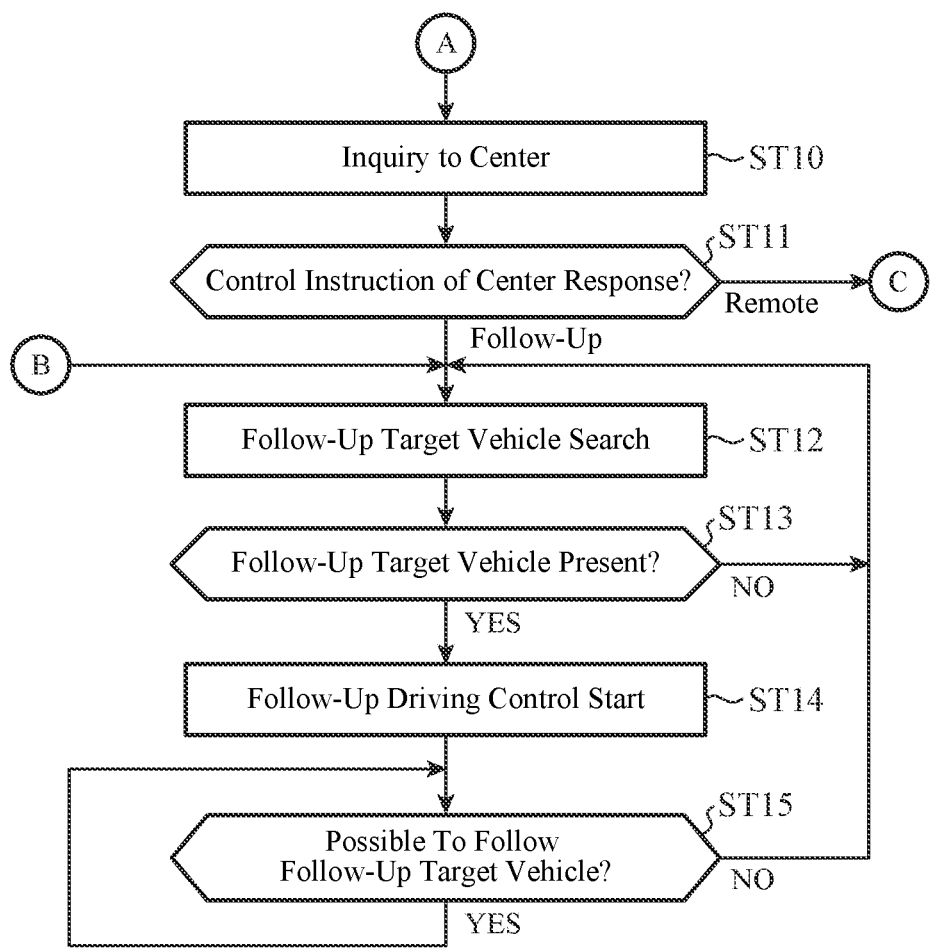
FIG. 3B is a continuation of the flowchart illustrated in FIG. 3A.

FIGS. 3A and 3B are flowcharts illustrating an operation example of the vehicle control device 10 in a case where it is necessary to switch the driving control of the host vehicle. The vehicle control device 10 starts the operation of the flowcharts illustrated in FIGS. 3A and 3B when remote control of the host vehicle is required. For example, in a case where the autonomous driving control unit 13 notifies in advance that the autonomous driving control of the host vehicle cannot be continued, or in a case where it is detected that the manual driving of the driver is difficult to continue on the basis of the state of the driver detected by the in-vehicle camera 1, the control switching unit 16 starts the operation of the flowcharts illustrated in FIGS. 3A and 3B.

In step ST1, the control switching unit 16 determines whether to switch from the autonomous driving control to the remote driving control, the follow-up driving control, or the inquiry to the remote control center on the basis of a predetermined priority order of the driving control of the host vehicle.

When the remote driving control has the highest priority (step ST1 "Remote"), the control switching unit 16 performs switching to the remote driving control in step ST2 and subsequent steps. When the priority of the inquiry to center is the highest (step ST1 "Inquiry to Center"), the control switching unit 16 performs the operation of step ST10. When the priority of the follow-up driving control is the highest (step ST1 "Follow-Up"), the control switching unit 16 performs switching to the follow-up driving control in step ST12 and subsequent steps.

In step ST2, the control switching unit 16 transmits a remote control request to the remote control center via the communication unit 11. In step ST3, the communication quality detecting unit 12 detects the quality of communication between the communication unit 11 and the remote control center, and outputs the detected communication quality to the control switching unit 16. The control switching unit 16 determines whether or not the communication quality detected by the communication quality detecting unit 12 is equal to or higher than a predetermined communication quality. The predetermined communication quality is communication quality (for example, the maximum delay time) required for the remote control center to remotely control the host vehicle. If the communication quality detected by the communication quality detecting unit 12 is equal to or higher than the predetermined communication quality (step ST3 "YES"), the control switching unit 16 transmits a remote control start request to the remote control center via the communication unit 11 in step ST4. On the other hand, when the communication quality detected by the communication quality detecting unit 12 is less than the predetermined communication quality (step ST3 "NO"), the control switching unit 16 performs the operation of step ST8.

In step ST5, the communication unit 11 receives a remote control start response from the remote control center. When the communication unit 11 receives the remote control start response, the control switching unit 16 switches the driving control of the host vehicle from the autonomous driving control unit 13 to the remote driving control unit 14 in step ST6. When the remote driving control unit 14 starts the remote driving control, the control switching unit 16 transmits, to the remote control center via the communication unit 11, information used for the remote control by the remote control center among various types of information received from the input unit 17. When the remote driving control unit 14 starts the remote driving control, the communication unit 11 receives remote control information for remotely controlling the host vehicle from the remote control center and outputs the received information to the control switching unit 16. The control switching unit 16 receives the remote control information from the communication unit 11 acid outputs the received information to the remote driving control unit 14. The remote driving control unit 14 calculates a command value to the traveling control device 7 on the basis of the remote control information, and outputs the calculated command value to the traveling control device 7 via the output unit 18.

In step ST7, the communication quality detecting unit 12 detects the quality of communication between the communication unit 11 and the remote control center during the remote driving control, and outputs the detected communication quality to the control switching unit 16. The control switching unit 16 determines whether or not the communication quality detected by the communication quality detecting unit 12 is equal to or higher than the predetermined communication quality. If the communication quality detected by the communication quality detecting unit 12 is equal to or higher than the predetermined communication quality (step ST7 "YES"), the control switching unit 16 causes the remote driving control unit 14 to continue the remote driving control. On the other hand, if the communication quality detected by the communication quality detecting unit 12 is less than the predetermined communication quality (step ST7 "NO"), the control switching unit 16 performs the operation of step ST8.

In step ST8, the control switching unit 16 inquires of the remote control center via the communication unit 11 about presence or absence of another vehicle traveling within a predetermined range including the host vehicle and capable of switching from the remote driving control to the follow-up driving control. The predetermined range means within a communication area of the same base station.

For example, in FIG. 1, when the host vehicle is the vehicle 104, the control switching unit 16 inquires of the second remote control center 111 that remotely controls the vehicle 104 about the presence or absence of a vehicle capable of switching from the remote driving control to the follow-up driving control among the vehicles 100 to 103 and 105 to 107 traveling in the communication area of the first base station 120. The vehicle 104 corresponds to a "first vehicle", and the vehicles 100 to 103, 105 to 107 correspond to a "second vehicle". The first remote control center 110, the second remote control center 111, and the third remote control center 112 receive information indicating whether the driving control of the vehicles 100 to 107 is autonomous driving, remote driving, or follow-up driving from each of the vehicles 100 to 107, and perform centralized management. When there is an inquiry about the presence or absence of a vehicle capable of switching from the remote driving control to the follow-up driving control from the vehicle 104, the second remote control center 111 transmits an instruction to switch from the remote driving control to the follow-up driving control to the vehicle 102 during the remote driving control. Then, the second remote control center 111 receives, from the vehicle 102, a switching completion notification or an unswitchable notification for the follow-up driving control.

In addition, the second remote control center 111 notifies the first remote control center 110 and the third remote control center 112 of the inquiry from the vehicle 104. Upon receiving this notification, the first remote control center 110 and the third remote control center 112 transmit instructions to switch from the remote driving control to the follow-up driving control to the vehicles 100, 101, 103, 105, and 107 during remote control. The first remote control center 110 and the third remote control center 112 then receive a switching completion notification or an unswitchable notification for the follow-up driving control from each of the vehicles 100, 101, 103, 105, and 107. Upon receiving the switching completion notification from at least one vehicle, the first remote control center 110 and the third remote control center 112 notify the second remote control center 111 of reception of the switching completion notification.

When at least one of the vehicles 100 to 103 and 105 to 107 transmits the switching completion notification, the second remote control center ill notifies the vehicle 104 that there is a vehicle capable of switching from the remote driving control to the follow-up driving control among the vehicles 100 to 103 and 105 to 107 traveling in the communication area of the first base station 120. On the other hand, when all of the vehicles 100 to 103 and 105 to 107 transmit the unswitchable notification, the second remote control center 111 notifies the vehicle 104 that there is no vehicle capable of switching from the remote driving control to the follow-up driving control.

When at least one of the vehicles 100 to 103 and 105 to 107 traveling in the communication area of the first base station 120 switches from the remote driving control to the follow-up driving control, the communication band of the first base station 120 occupied for the remote control of the vehicle is released. As a result, the communication band of the first base station 120 is recovered, and the communication quality necessary for the remote control of the vehicle 104 by the second remote control center 111 is ensured.

In step ST9, the control switching unit 16 receives, from the remote control center via the communication unit 11 the presence or absence of another vehicle traveling within a predetermined range including the host vehicle and capable of switching from the remote driving control to the follow-up driving control. When the communication unit 11 receives the presence of corresponding another vehicle from the remote control center (step ST9 "YES"), the control switching unit 16 performs the operation of step ST3. On the other hand, when the communication unit 11 receives the absence of corresponding another vehicle from the remote control center (step ST9 "NO"), the control switching unit 16 performs switching to the follow-up driving control in step ST12 and subsequent steps.

In step ST10, the control switching unit 16 makes an inquiry to the remote control center via the communication unit 11. In step ST11, the communication unit 11 receives a response to the inquiry from the remote control center, and outputs a reception result to the control switching unit 16. When the remote control center instructs the host vehicle to perform remote driving control (step ST11 "Remote"), the control switching unit 16 performs switching to the remote driving control in step ST3 and subsequent steps. On the other hand, when the remote control center instructs the host vehicle to perform the follow-up driving control (step ST11 "Follow-Up"), the control switching unit 16 performs switching to the follow-up driving control after step ST12.

In step ST12, the control switching unit 16 switches the driving control of the host vehicle from the autonomous driving control unit 13 to the follow-up driving control unit 15. The follow-up driving control unit 15 detects a follow-up target vehicle traveling ahead of the host vehicle by using information input from the vehicle exterior camera 2 or the in-vehicle ECU 5 via the control switching unit 16. Alternatively, the follow-up driving control unit 15 detects a follow-up target vehicle traveling ahead of the host vehicle by using information received by the communication unit 11 from another vehicle through inter-vehicle communication. The follow-up driving control unit 15, when having detected the follow-up target vehicle (step ST13 "YES"), calculates a command value to the traveling control device 7 so that the host vehicle follows the follow-up target vehicle, and outputs the calculated command value to the traveling control device 7 via the output unit 18 (step ST14). On the other hand, the follow-up driving control unit 15, when having failed to detect the follow-up target vehicle (step ST13 "NO"), repeats the operation of step ST12. Note that, if the follow-up driving control unit 15 has failed to detect the follow-up target vehicle even after repeating the operations of steps ST12 and ST13 predetermined number of times, the control switching unit 16 may instruct the autonomous driving control unit 13 to stop the host vehicle on a road shoulder or the like.

If the host vehicle cannot follow the follow-up target vehicle during the follow-up driving control due to, for example, a difference between a route on which the host vehicle is scheduled to travel and a route on which the follow-up target vehicle is scheduled to travel (step ST15 "NO"), the follow-up driving control unit 15 performs an operation of detecting another follow-up target vehicle in step ST12. When the host vehicle can follow the follow-up target vehicle (step ST15 "YES"), the follow-up driving control unit 15 continues the follow-up driving control.

Figure 4:
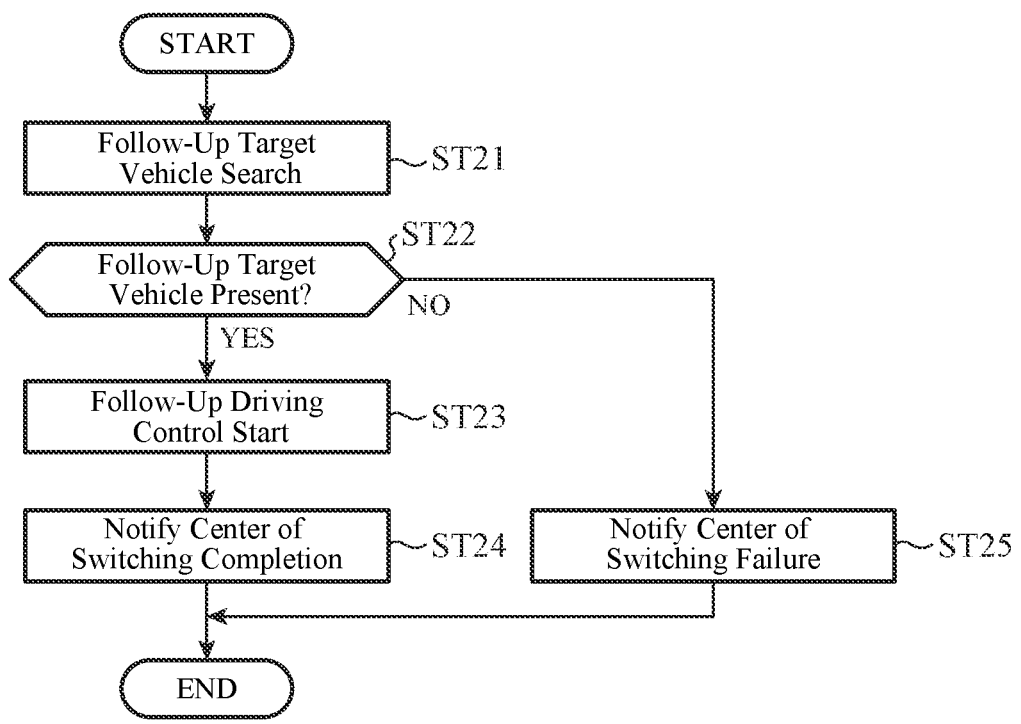
FIG. 4 is a flowchart illustrating an operation example of the vehicle control device when a remote-to-follow-up switching instruction is issued from a remote control center to the host vehicle.

FIG. 4 is a flowchart illustrating an operation example of the vehicle control device 10 when a remote-to-follow-up switching instruction is issued from the remote control center to the host vehicle. The remote-to-follow-up switching instruction is an instruction for switching from the remote driving control to the follow-up driving control, the instruction being transmitted from the remote control center to the second vehicle in step ST8 in FIG. 3A. The communication unit 11, when having received the remote-to-follow-up switching instruction from the remote control center, notifies the control switching unit 16 of the reception of the instruction.

In step ST21, the control switching unit 16 notifies the remote driving control unit 14 and the follow-up driving control unit 15 that the driving control of the host vehicle is switched from the remote driving control to the follow-up driving control. Upon receiving this notification, the follow-up driving control unit 15 performs, in steps ST21, ST22, and ST23, operations similar to those in steps ST12, STI3, and ST14 in FIG. 3B. When the follow-up driving control unit 15 starts follow-up driving control (step ST23), the control switching unit 16 transmits a switching completion notification to the remote control center via the communication unit 11 (step S124). When the host vehicle switches from the remote driving control to the follow-up driving control, the communication band of the base station occupied for the remote driving control of the host vehicle is released. As a result, communication quality necessary for remote control of another vehicle traveling in the communication area of the base station is ensured.

Note that, if the follow-up driving control unit 15 has failed to detect the follow-up target vehicle (step ST22 "NO"), the control switching unit 16 transmits an unswitchable notification to the remote control center via the communication unit 11 (step ST25).

Next, examples of two use cases of the vehicle control system according to the first embodiment will be described. A first use case is an example of a case where the communication quality is low, and a second use case is an example of a case where the operator is insufficient.

Figure 5:
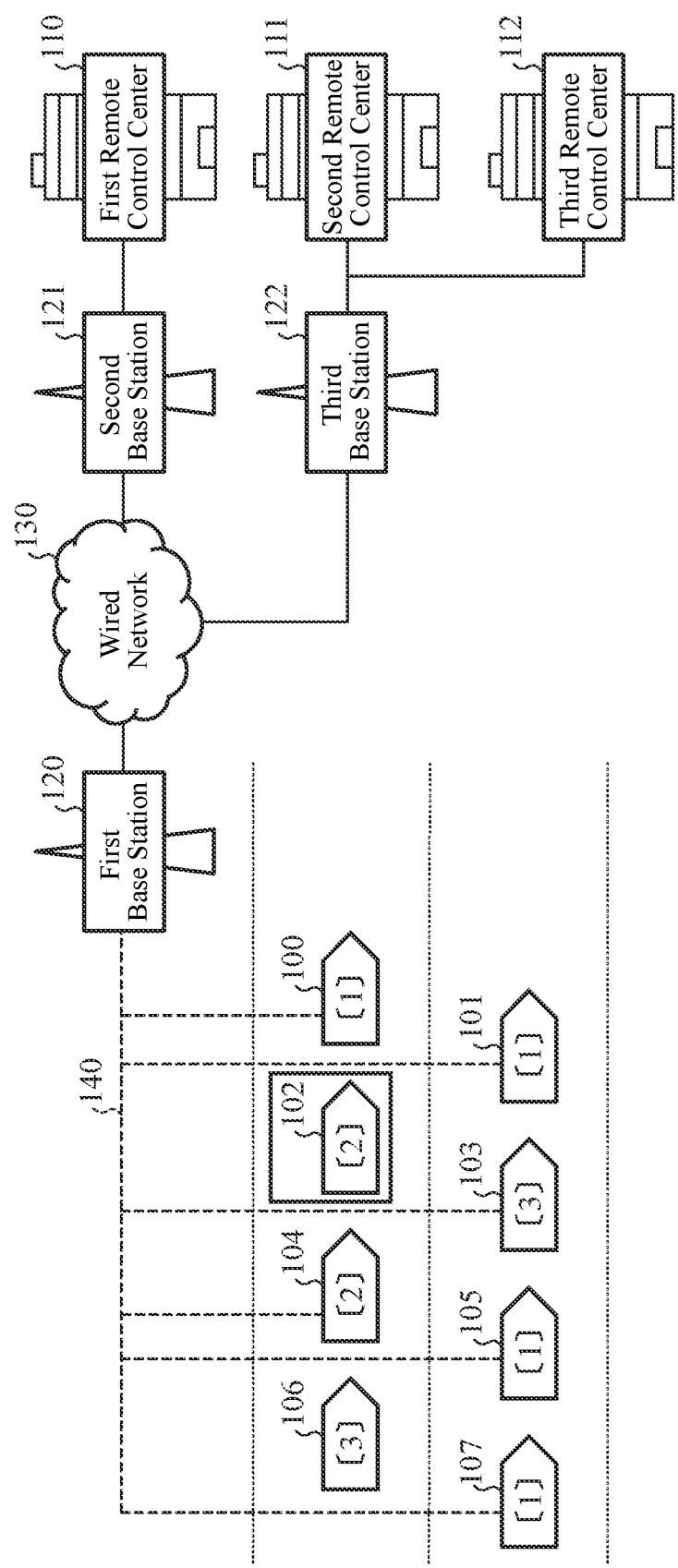
FIG. 5 is an overall configuration diagram of a vehicle control system before switching of driving control in a first use case.

FIG. 5 is an overall configuration diagram of a vehicle control system before switching of driving control in the first use case. In the first use case, the vehicle 102 makes a remote control request to the second remote control center 111. As a premise, the vehicles 100, 101, 103, 104, 105, and 107 are remotely controlled by the first remote control center 110, the second remote control center 111, or the third remote control center 112 via the radio network 140. The vehicles 102 and 106 autonomously travel by autonomous driving control.

Since the vehicle control device 10 mounted on the vehicle 102 detects that the autonomous driving control cannot be continued for some reason, the vehicle control device 10 attempts switching to the remote driving control in accordance with a predetermined priority order of the driving control. In the vehicle control device 10 of the vehicle 102, "the maximum delay time of less than 1000 ms" is determined in advance as the communication quality necessary for the remote driving control. However, since the maximum delay time actually detected by the communication quality detecting unit 12 exceeds 1000 ms, the control switching unit 16 determines that the communication quality of the radio network 140 does not satisfy the communication quality necessary for the remote driving control. Therefore, the vehicle control device 10 of the vehicle 102 inquires of the second remote control center 111 about the presence or absence of a vehicle capable of switching from the remote driving control to the follow-up driving control among the vehicles 100 to 107 traveling in the communication area of the first base station 120.

Figure 6:
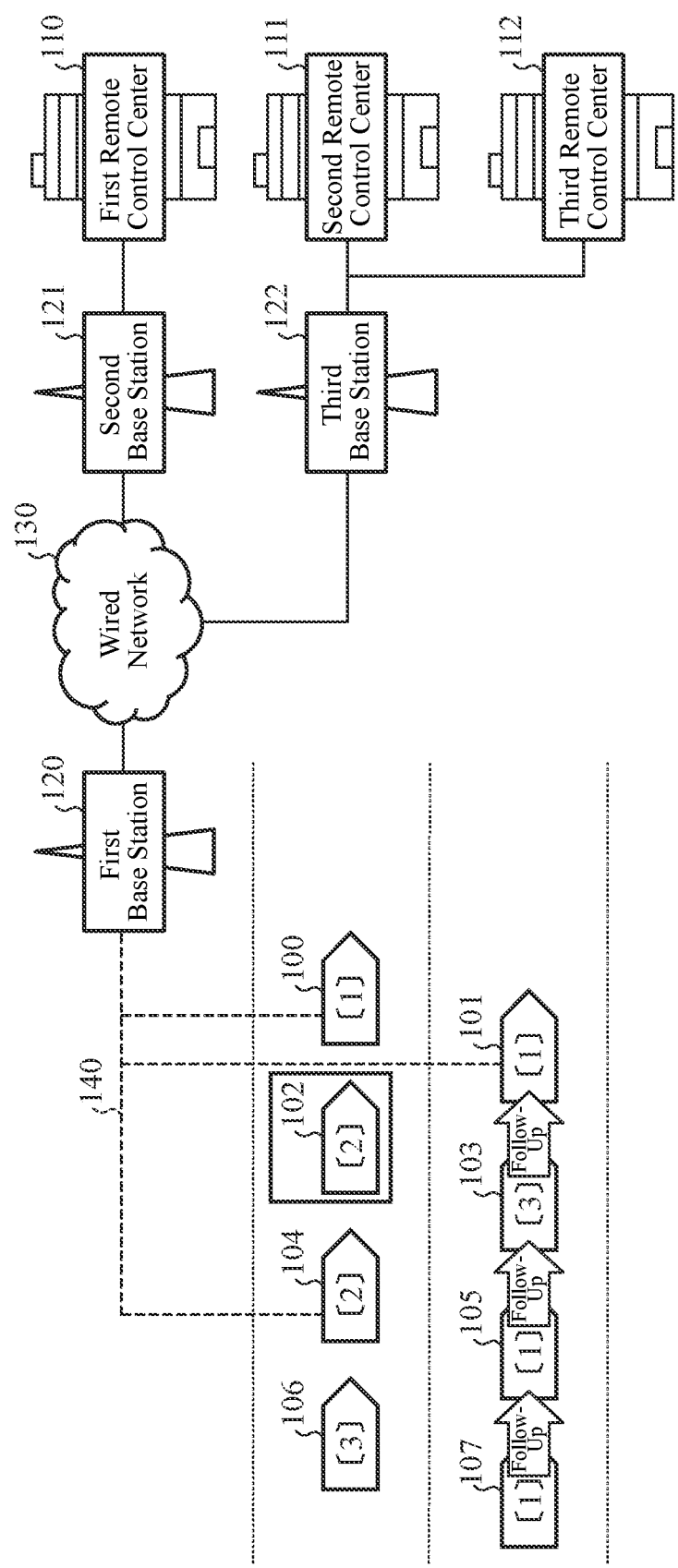
FIG. 6 is an overall configuration diagram of the vehicle control system after switching of driving control in the first use case.

FIG. 6 is an overall configuration diagram of a vehicle control system after switching of driving control in the first use case. In accordance with the remote-to-follow-up switching instruction from the second remote control center 111 that has received the inquiry from the vehicle 102 and the remote-to-follow-up switching instruction from the first remote control center 110 and the third remote control center 112 that have received the notification of reception of the inquiry, the vehicles 103, 105, and 107 switch from the remote driving control to the follow-up driving control. As a result, since the communication quality necessary for the remote control can be ensured, the vehicle control device 10 of the vehicle 102 switches from the autonomous driving control to the remote driving control.

Figure 7:
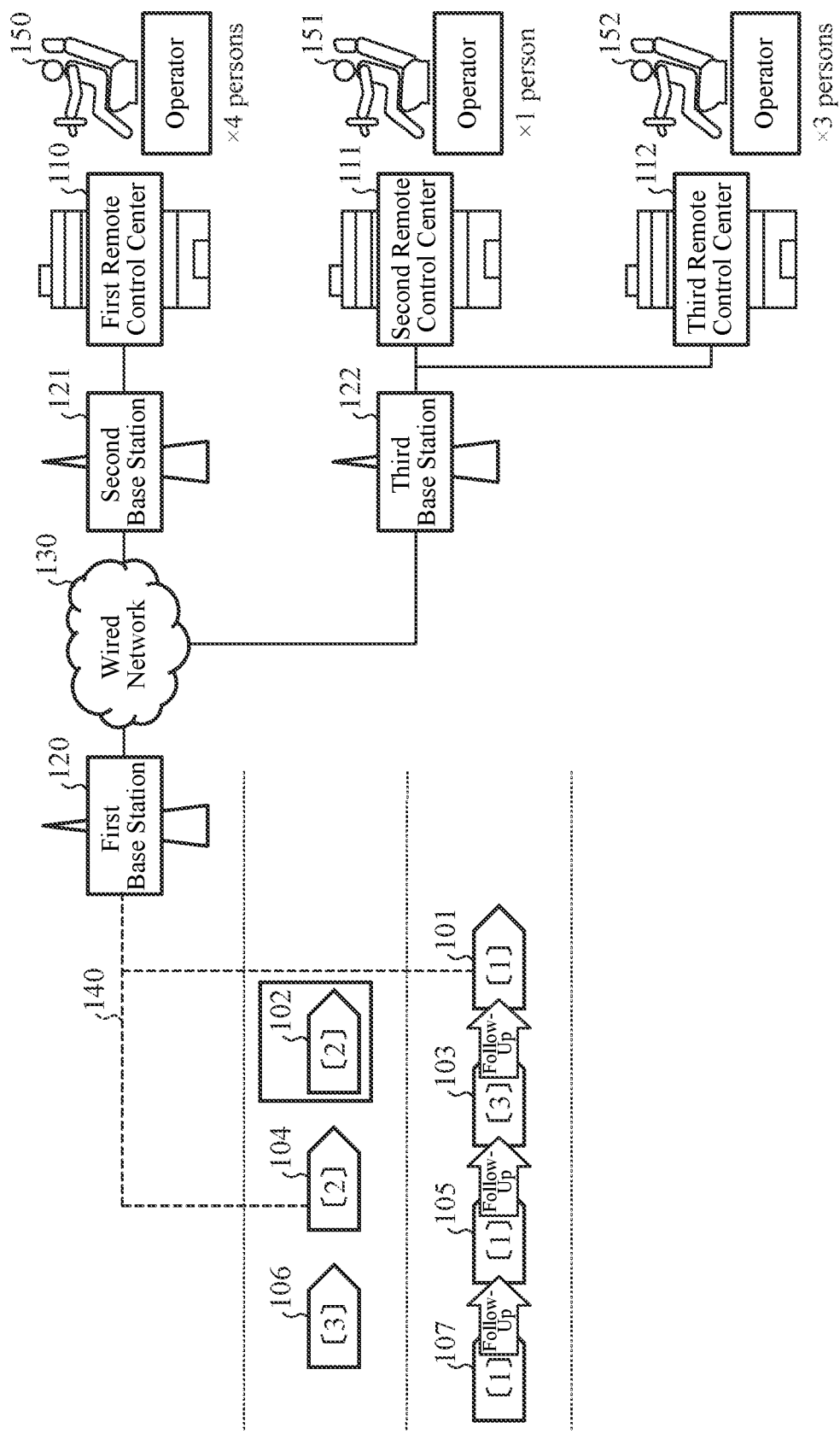
FIG. 7 is an overall configuration diagram of the vehicle control system before switching of driving control in a second use case.

FIG. 7 is an overall configuration diagram of a vehicle control system before switching of driving control in the second use case. In the second use case, the vehicle 102 makes a remote control request to the second remote control center 111. As a premise, the vehicles 101 and 104 are remotely controlled by the first remote control center 110 and the second remote control center 111 via the radio network 140. Each of the vehicles 103, 105, and 107 follows the preceding vehicle. The vehicle 106 autonomously travels by autonomous driving control. There are four operators 150 at the first remote control center 110, one operator 151 at the second remote control center 111, and three operators 152 at the third remote control center 112. In addition, the communication band of the first base station 120 is sufficient.

Since the vehicle control device 10 mounted on the vehicle 102 detects that the autonomous driving control cannot be continued for some reason, the vehicle control device 10 attempts switching to the remote driving control in accordance with a predetermined priority order of the driving control. However, there is only one operator 151 at the second remote control center 111 that remotely controls the vehicle 102, and this operator 151 has already remotely controlled the vehicle 104. Thus, the operator 151 assigned to the remote control of the vehicle 102 is not present in the second remote control center 111. Therefore, the second remote control center 111 transmits a remote-to-follow-up switching instruction to the vehicle 104 during remote driving control.

Figure 8:
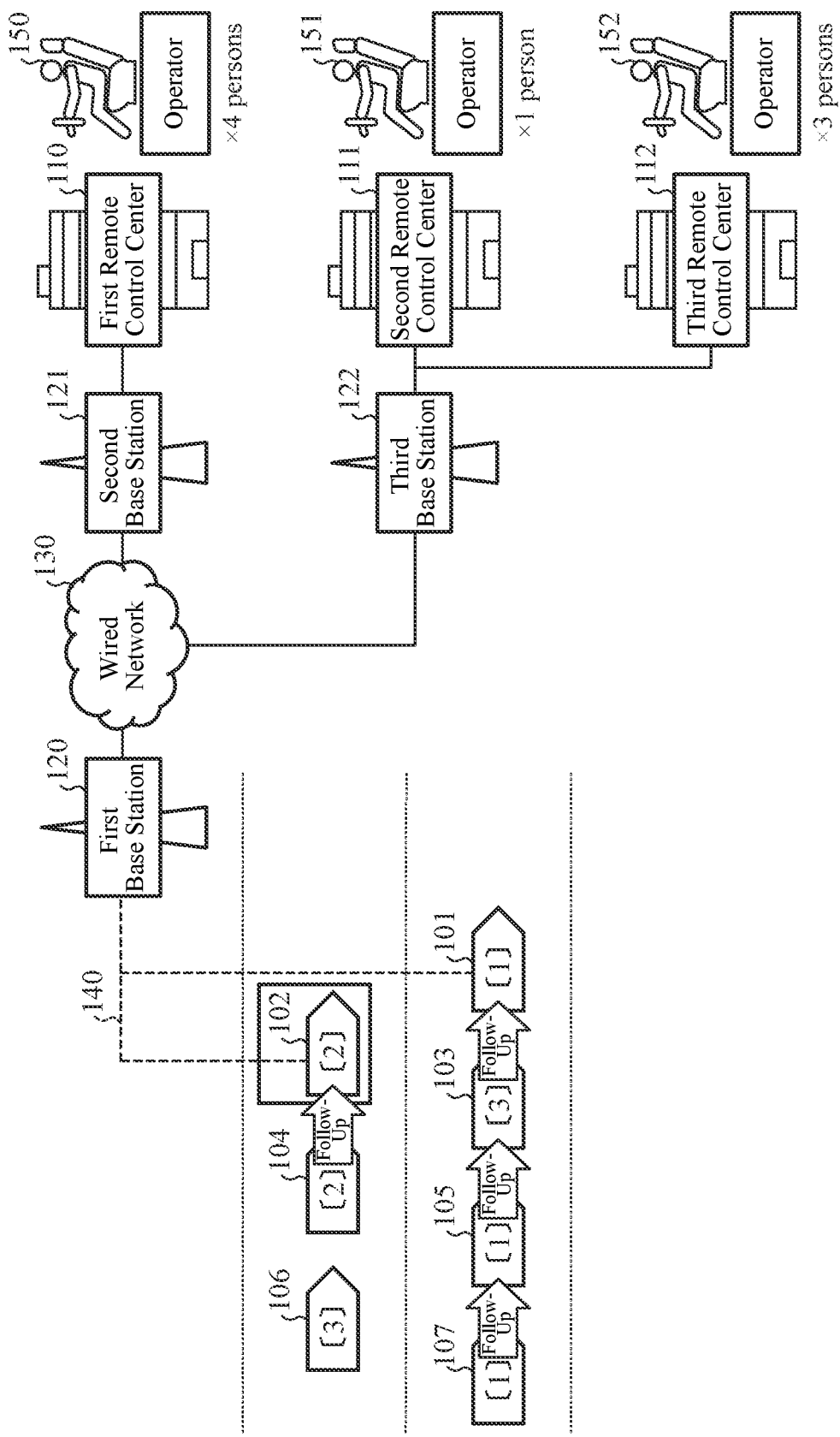
FIG. 8 is an overall configuration diagram of the vehicle control system after switching of driving control in the second use case.

FIG. 8 is an overall configuration diagram of a vehicle control system after switching of driving control in the second use case. Since the vehicle 102 is present ahead of the vehicle 104, the vehicle control device 10 of the vehicle 104 switches from the remote driving control to the follow-up driving control in accordance with the remote-to-follow-up switching instruction from the second remote control center 111. As a result, the operator 151 at the second remote control center 111 can terminate the remote control of the vehicle 104 and start the remote control of the vehicle 102. The vehicle control system of the second use case implements efficient remote control with a smaller number of people by rearranging the operator 151.

Finally, a hardware configuration of the vehicle control device 10 according to the first embodiment will be described.

Figure 9:
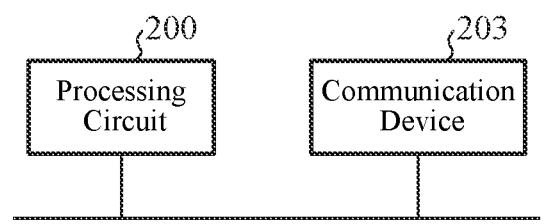
FIG. 9 is a diagram showing an example of a hardware configuration of the vehicle control device according to the first embodiment.
Figure 10:
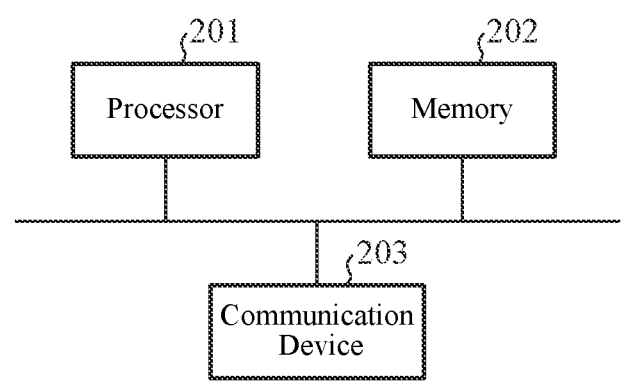
FIG. 10 is a diagram showing another example of the hardware configuration of the vehicle control device according to the first embodiment.

FIGS. 9 and 10 are diagrams showing an example of the hardware configuration of the vehicle control device 10 according to the first embodiment. The function of the communication unit 11 in the vehicle control device 10 is implemented by a communication device 203. The functions of the communication quality detecting unit 12, the autonomous driving control unit 13, the remote driving control unit 14, the follow-up driving control unit 15, the control switching unit 16, the input unit 17, and the output unit 18 in the vehicle control device 10 are implemented by a processing circuit. That is, the vehicle control device 10 includes a processing circuit for implementing the above functions. The processing circuit may be a processing circuit 200 as dedicated hardware, or may be a processor 201 that executes a program stored in a memory 202.

When the processing circuit is dedicated hardware as shown FIG. 9, for example, a single circuit, a composite circuit, a programmed processor, a parallel-programmed processor, an ASIC (Application Specific Integrated. Circuit), an FPGA (Field-Programmable Gate Array), or a combination thereof corresponds to the processing circuit 200. The functions of the communication quality detecting unit 12, the autonomous driving control unit 13, the remote driving control unit 14, the follow-up driving control unit 15, the control switching unit 16, the input unit 17, and the output unit 18 may be implemented by a plurality of processing circuits 200, or the functions of the respective units may be collectively implemented by one processing circuit 200. Furthermore, the function of the communication device 203 may be implemented by the processing circuit 200.

As illustrated in FIG. 10, when the processing circuit is the processor 201, the functions of the communication quality detecting unit 12, the autonomous driving control unit 13, the remote driving control unit 14, the follow-up driving control unit 15, the control switching unit 16, the input unit 17, and the output unit 18 are implemented by software, firmware, or a combination of software and firmware. Software or firmware is described as a program and stored in the memory 202. The processor 201 implements the functions of the respective units by reading and executing the program stored in the memory 202. That is, the vehicle control device 10 includes the memory 202 for storing a program that results in execution of steps illustrated in the flowcharts of FIGS. 3A, 3B, and 4 when executed by the processor 201. It can also be said that this program causes a computer to execute a procedure or a method performed by the communication quality detecting unit 12, the autonomous driving control unit 13, the remote driving control unit 14, the follow-up driving control unit 15, the control switching unit 16, the input unit 17, and the output unit 18.

Here, the processor 201 is a central processing unit (CPU), a processing device, an arithmetic device, a microprocessor, or the like.

The memory 202 may be a nonvolatile or volatile semiconductor memory such as a random access memory (RAM), a read only memory (ROM), an erasable programmable ROM (EPROM), or a flash memory, may be a magnetic disk such as a hard disk or a flexible disk, or may be an optical disk such as a compact disc (CD) or a digital versatile disc (DVD).

Note that the functions of the communication quality detecting unit 12, the autonomous driving control unit 13, the remote driving control unit 14, the follow-up driving control unit 15, the control switching unit 16, the input unit 17, and the output unit 18 may be partially implemented by dedicated hardware and partially implemented by software or firmware. Thus, the processing circuit in the vehicle control device 10 can implement the above functions by hardware, software, firmware, or a combination thereof.

As described above, the vehicle control device 10 according to the first embodiment includes the communication unit 11, the communication quality detecting unit 12, the remote driving control unit 14, the follow-up driving control unit 15, and the control switching unit 16. The communication unit 11 communicates with the remote control center and receives remote control information for remotely controlling the host vehicle from the remote control center. The communication quality detecting unit 12 detects the communication quality of the communication unit 11. The remote driving control unit 14 controls driving of the host vehicle using the remote control information. The follow-up driving control unit 15 controls driving of the host vehicle so as to travel following a preceding vehicle traveling ahead of the host vehicle. The control switching unit 16 switches the driving control of the host vehicle to the remote driving control unit 14 or the follow-up driving control unit 15. When the communication quality detected by the communication quality detecting unit 12 becomes lower than the predetermined communication quality while the remote driving control unit 14 is being caused to perform the driving control of the host vehicle (step ST7 in FIG. 3A "NO"), the control switching unit 16 inquires of the remote control center via the communication unit 11 about the presence or absence of another vehicle traveling within a predetermined range including the host vehicle and capable of switching from the remote driving control to the follow-up driving control. The control switching unit 16 causes the remote driving control unit 14 to continuously control driving of the host vehicle when there is a response indicating presence of a corresponding another vehicle, and causes the follow-up driving control unit 15 to control driving of the host vehicle when there is a response indicating absence of a corresponding another vehicle. Since the remote control center causes another vehicle traveling around the host vehicle to switch from the remote driving control to the follow-up driving control, the communication band available to the host vehicle is recovered. Therefore, the vehicle control device 10 can ensure the communication quality necessary for the remote control of the host vehicle, and can continue the remote driving control.

When the communication quality detected by the communication quality detecting unit 12 before causing the remote driving control unit 14 to control driving of the host vehicle is less than the predetermined communication quality (step ST3 "NO"), the control switching unit 16 according to the first embodiment inquires of the remote control center via the communication unit 11 about the presence or absence of another vehicle traveling within a predetermined range including the host vehicle and capable of switching from the remote driving control to the follow-up driving control. The control switching unit 16 causes the remote driving control unit 14 to control driving of the host vehicle when there is a response indicating presence of a corresponding another vehicle, and causes the follow-up driving control unit 15 to control driving of the host vehicle when there is a response indicating absence of a corresponding another vehicle. Since the remote control center causes another vehicle traveling around the host vehicle to switch from the remote driving control to the follow-up driving control, the communication band available to the host vehicle is recovered. Therefore, the vehicle control device 10 can ensure communication quality necessary for remote control of the host vehicle, and can start remote driving control.

When the communication unit 11 receives an instruction to switch from the remote driving control to the follow-up driving control transmitted from the remote control center while the remote driving control unit 14 is being caused to control driving of the host vehicle, the control switching unit 16 of the first embodiment causes the follow-up driving control unit 15 to control driving of the host vehicle when there is a preceding vehicle, and notifies the remote control center of the switching completion. On the other hand, when there is no preceding vehicle, the control switching unit 16 causes the remote driving control unit 14 to continuously control driving of the host vehicle, and notifies the remote control center that switching is impossible. When the vehicle control device 10 of the host vehicle switches from the remote driving control to the follow-up driving control, another vehicle can ensure the communication quality necessary for the remote control, and the another vehicle can perform the remote driving control.

It should be noted that the invention of the present application is capable of modifying any of the constituent elements of the embodiment or omitting any of the constituent elements of the embodiment within the scope of the invention.

INDUSTRIAL APPLICABILITY

Since the vehicle control device according to the present invention remotely controls the vehicle by using the remote control information from the remote control center, the vehicle control device is suitable for use in a control device or the like that remotely controls a mobile object capable of autonomous movement, such as a vehicle.

REFERENCE SIGNS LIST

1: in-vehicle camera, 2: vehicle exterior camera, 3: GPS sensor, 4: map storage unit, 5: in-vehicle ECU, 6: external network, 7: traveling control device, 10: vehicle control device, 11: communication unit, 12: communication quality detecting unit, 13: autonomous driving control unit, 14: remote driving control unit, 15: follow-up driving control unit, 16: control switching unit, 17: input unit, 18: output unit, 100 to 107: vehicle. 110: first remote control center, 111: second remote control center, 112: third remote control center, 120: first base station, 121: second base station, 122: third base station, 130: wired network, 140: radio network, 150, 151, 152: operator, 200: processing circuit, 201: processor, 202: memory, 203: communication device.

The invention claimed is:
1. A vehicle control device, comprising:
processing circuitry configured to
communicate with a remote control center and receive remote control information for remotely controlling a first vehicle from the remote control center;
detect communication quality;
control driving of the first vehicle based on remote driving control using the remote control information;
control the driving of the first vehicle based on follow-up driving control so as to travel following a preceding vehicle traveling ahead of the first vehicle; and
take control of the driving of the first vehicle by switching the remote driving control and the follow-up driving control,
wherein the processing circuitry inquires of the remote control center via the communication as to presence or absence of a second vehicle traveling within a predetermined range including the first vehicle, the second vehicle being switchable from the remote driving control to the follow-up driving control, when the detected communication quality becomes less than a predetermined communication quality during the control of the driving of the first vehicle based on the remote driving control, and
the processing circuitry continuously controls the driving of the first vehicle based on the remote driving control when there is a response indicating absence of the second vehicle, and
the processing circuitry controls the driving of the first vehicle based on the follow-up driving control when there is a response indicating presence of the second vehicle.

2. The vehicle control device according to claim 1,
wherein the processing circuitry inquires of the remote control center via the communication as to presence or absence of the second vehicle traveling within the predetermined range and being switchable from the remote driving control to the follow-up driving control when the detected communication quality before controlling the driving of the first vehicle based on the remote driving control is less than the predetermined communication quality, and
the processing circuitry controls the driving of the first vehicle based on the remote driving control when there is a response indicating presence of the corresponding second vehicle, and the processing circuitry controls the driving of the first vehicle based on the follow-up driving control when there is a response indicating absence of the corresponding second vehicle.

3. The vehicle control device according to claim 1, wherein when the processing circuitry receives an instruction to switch from the remote driving control to the follow-up driving control, the instruction being transmitted from the remote control center during the control of the driving of the first vehicle based on the remote driving control, and the preceding vehicle is present, the processing circuitry controls the driving of the first vehicle based on the follow-up driving control and notifies the remote control center of switching completion, and when the processing circuitry receives the instruction, and the preceding vehicle is not present, the processing circuitry continuously controls the driving of the first vehicle based on the remote driving control and notifies the remote control center of unswitchability.

4. A vehicle control method of a vehicle control device including: processing circuitry configured to communicate with a remote control center and receive remote control information for remotely controlling a first vehicle from the remote control center; detect communication quality; control driving of the first vehicle based on remote driving control using the remote control information; control the driving of the first vehicle based on follow-up driving control so as to travel following a preceding vehicle traveling ahead of the first vehicle; and take control of the driving of the first vehicle by switching the remote driving control or the follow-up driving control, the vehicle control method comprising:

inquiring of the remote control center via the communication as to presence or absence of a second vehicle traveling within a predetermined range including the first vehicle, the second vehicle being switchable from the remote driving control to the follow-up driving control, when the detected communication quality becomes less than a predetermined communication quality during the control of the driving of the first vehicle based on the remote driving control;

continuously controlling the driving of the first vehicle based on the remote driving control when there is a response indicating presence of the second vehicle; and controlling the driving of the first vehicle based on the follow-up driving control when there is a response indicating absence of the second vehicle.

5. The vehicle control device according to claim 1, wherein the communication quality indicates a maximum transmission time.

* * * * *